US006934751B2

(12) United States Patent
Jayapalan et al.

(10) Patent No.: US 6,934,751 B2
(45) Date of Patent: Aug. 23, 2005

(54) METHOD AND DEVICE FOR PROVIDING MORE ACCURATE SUBSCRIBER DEVICE BILLING

(75) Inventors: Jay Jayapalan, Buffalo Grove, IL (US); Shreesha Ramanna, Wheeling, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/307,135

(22) Filed: Nov. 29, 2002

(65) Prior Publication Data

US 2004/0107241 A1 Jun. 3, 2004

(51) Int. Cl.[7] .............................................. G06F 13/00
(52) U.S. Cl. ...................... 709/224; 709/217; 709/236; 709/238
(58) Field of Search ................................. 709/217, 224, 709/236, 238, 219, 223, 227, 228, 237; 719/328, 329

(56) References Cited

U.S. PATENT DOCUMENTS

| 5,371,731 A | * | 12/1994 | Pratt et al. ................... 370/216 |
| 6,115,393 A | * | 9/2000 | Engel et al. ................. 370/469 |
| 6,199,076 B1 | * | 3/2001 | Logan et al. ............. 715/501.1 |
| 6,201,791 B1 | * | 3/2001 | Bournas ...................... 370/234 |
| 6,480,749 B1 | * | 11/2002 | Lee et al. ...................... 700/32 |

* cited by examiner

*Primary Examiner*—Viet D. Vu

(57) ABSTRACT

A PDSN (18) includes a usage recording agent (19) for distinguishing between nonbillable and billable activity of a subscriber device 12. The usage recording agent (19) creates a record of a total number of bytes transmitted from the PDSN (18) to the RAN (14), counts bytes that are retransmitted from the PDSN (18) for providing a retransmitted byte total, and forwards the retransmitted byte total and the record to an AAA (28) so that the record can be adjusted in accordance with the retransmitted byte total.

8 Claims, 4 Drawing Sheets

US 6,934,751 B2

METHOD AND DEVICE FOR PROVIDING MORE ACCURATE SUBSCRIBER DEVICE BILLING

FIELD OF THE INVENTION

This invention relates in general to wireless communication systems, and more specifically to a method and device for providing more accurate subscriber device billing information.

BACKGROUND OF THE INVENTION

Communication systems that provide services to subscriber devices, such as Code-Division Multiple Access (CDMA) systems often base the bills for such services on the amount of services consumed or used. Therefore the systems often collect usage data corresponding to each subscriber device for billing purposes. A system element, such as a Packet Data Serving Node (PDSN), typically collects usage data, such as the number of bytes transmitted to and from each subscriber device and generates a Usage Data Record (UDR) corresponding to these bytes. However, often not all of these bytes represent "usage" by the subscriber device. For example, bytes that are transmitted due to system overhead activities arguably should not be included in the UDR. Examples of overhead include traffic that results from mobility of subscriber devices as well as radio frequency transmission errors. Both of these examples and others can increase overhead, thus bytes transmitted to and from subscriber devices that do not represent usage by the subscriber device. Clearly a need exists for methods and devices for providing more accurate billing information.

BRIEF DESCRIPTION OF THE DRAWINGS

The accompanying figures, where like reference numerals refer to identical or functionally similar elements and which together with the detailed description below are incorporated in and form part of the specification, serve to further illustrate various embodiments and to explain various principles and advantages all in accordance with the present invention.

DETAILED DESCRIPTION OF PREFERRED EMBODIMENTS

In overview form the present disclosure concerns communication systems that provide billing records such as call detail records, charging records or usage data records (UDRs) for subscriber devices. For simplicity, these billing records will all be referred to as UDRs. Note that subscriber device or unit may be used interchangeably herein with wireless device, mobile station or unit and each of these terms denotes a device ordinarily associated with a user and typically a wireless device that may be used within a public network in accordance with a service agreement or within a private network.

As further discussed below, various inventive principles and combinations thereof are advantageously employed to provide more accurate UDRs, thus providing more accurate billing for a subscriber device.

The instant disclosure is provided to further explain in an enabling fashion the best modes of making and using various embodiments in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms, if any, such as first and second, top and bottom, and the like are used solely to distinguish one from another entity or action without necessarily requiring or implying any actual such relationship or order between such entities or actions. Much of the inventive functionality and many of the inventive principles are best implemented with or in software programs or instructions. It is expected that one of ordinary skill, notwithstanding possibly significant effort and many design choices motivated by, for example, available time, current technology, and economic considerations, when guided by the concepts and principles disclosed herein will be readily capable of generating such software instructions and programs with minimal experimentation. Therefore, in the interest of brevity and minimization of any risk of obscuring the principles and concepts according to the present invention, further discussion of such software, if any, will be limited to the essentials with respect to the principles and concepts used by the preferred embodiments.

Figure 1:
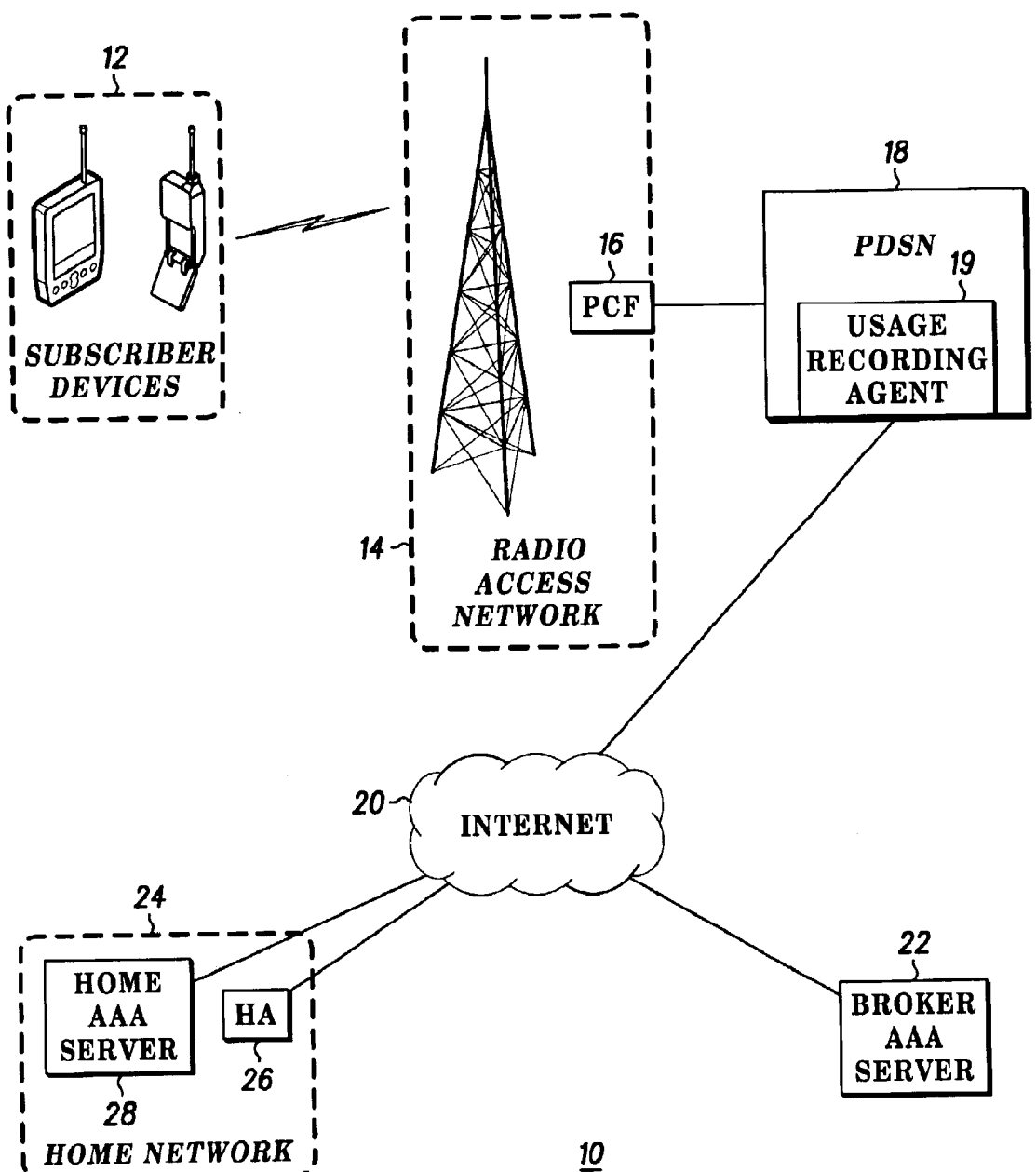
FIG. 1 depicts, in a simplified and representative form, a communication system for providing more accurate billing for a subscriber device.

Referring to FIG. 1, a simplified and representative communication system 10 that provides more accurate billing for one or more subscriber devices operating therein will be discussed and described. One or more subscriber devices 12 are arranged and constructed to send and receive traffic such as data over a wireless link to and from a known radio access network (RAN) 14. The RAN 14 is coupled to a packet data serving node (PDSN) 18 as is known. The RAN 14 includes a packet control function (PCF) 16 for interfacing with the PDSN 18. The PCF 16 is known and appreciated by those skilled in the art. The PDSN 18 includes a usage recording agent 19 (discussed below) and has a network connection to the Internet 20 as is also known. The system 10 also includes a broker authentication authorization and accounting server (broker) 22 and a home network 24. The home network 24 may be, for example, a subscriber device user's internet service provider and generates subscriber device bills based upon UDRs received from the PDSN 18. The home network 24 includes a home agent 26 for routing and tunneling internet traffic to and from the subscriber device 12 and a home authentication, authorization, and accounting server (AAA) 28 for maintaining security and an accounting relationship with the subscriber device 12. The broker 22 may be, for example, a subscriber device user's telephone service provider and provides login procedures (authorization and validation) for permitting the subscriber device user to obtain access to the home network and all shared resources. Also, the broker 22 has a security relationship with the AAA 28 for transferring authentication and accounting messages.

The usage recording agent 19 at the PDSN 18 may be, for example, a software program with associated instructions loaded onto the PDSN 18 or an additional hardware component (not shown) provided thereon. Although the usage recording agent 19 is shown as part of the PDSN 18, it may also be a separate and identifiable entity. In any event, when the usage recording agent 19 is installed and executing at or in conjunction with the PDSN 18, the PDSN 18 determines if predetermined nonbillable activity was performed during a time period, creates a record corresponding to the nonbillable activity and forwards the record to an accounting node such as the AAA 28 via the broker 22 so that a byte total can be adjusted in accordance with the record. Alternatively, the PDSN 18 may itself adjust the byte total in accordance with the record. As will be more fully discussed below, the predetermined nonbillable activity may include a retransmission of bytes by the PDSN 18, the sending of signaling data or the sending of data while the subscriber device has not responded to a notification of data arrival. The record will include a count of the bytes that are not usable by the subscriber device 12. Referring to FIGS. 2–6, operation of the PDSN 18 as a result of the usage recording agent 19 will be more specifically discussed.

Figure 2:
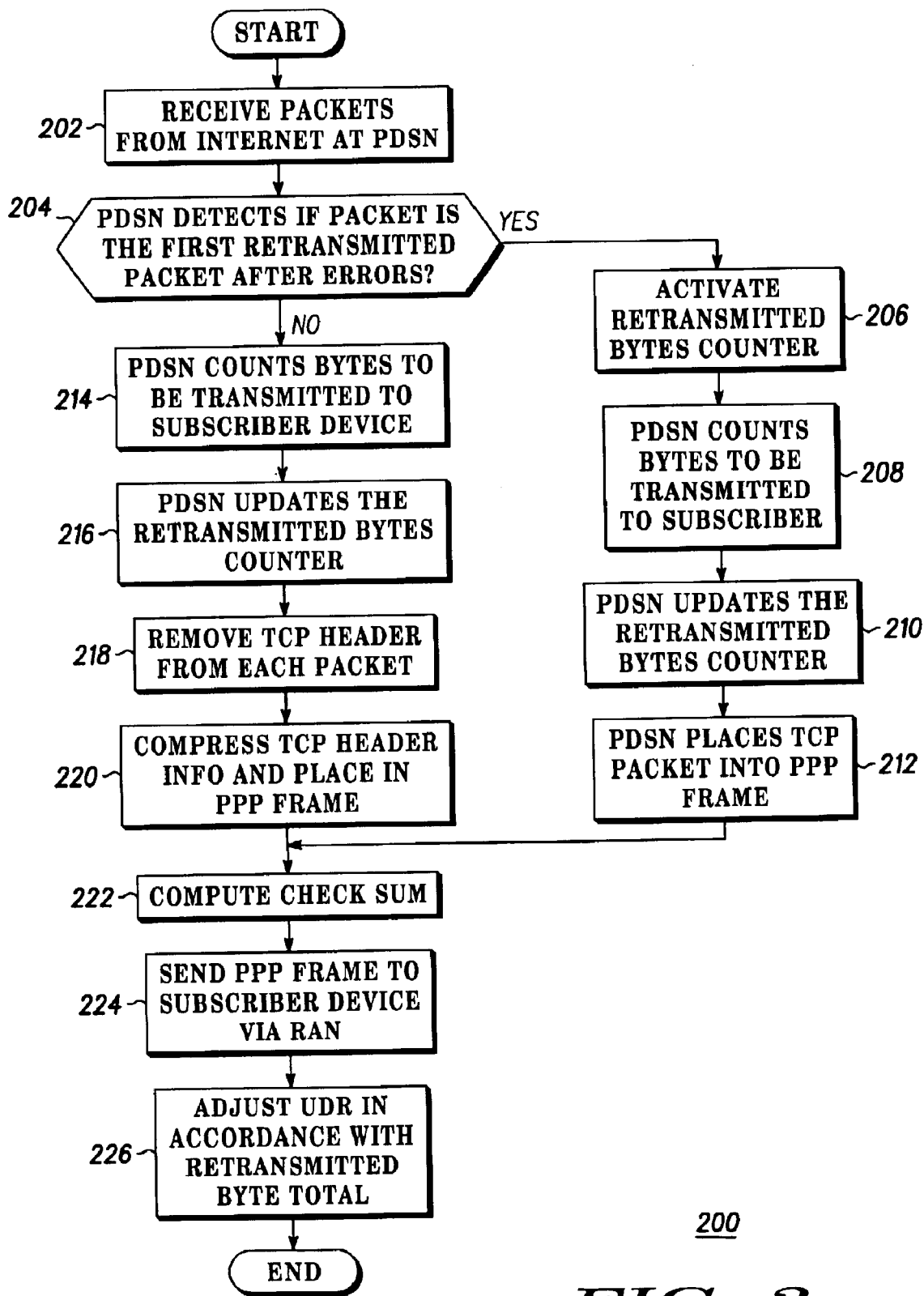
FIG. 2 illustrates a flow chart of a first embodiment for providing more accurate billing for a subscriber device.

Referring to FIG. 2, a flow diagram of a first embodiment will be discussed. Generally, the first embodiment provides more accurate billing for situations in which transmission control protocol internet protocol (TCP/IP) packets have been retransmitted to the subscriber device 12. The method 200 describes circumstances that apply for retransmission activities where one or more packets are retransmitted to the subscriber device. The method 200 begins at 202 with the PDSN 18 receiving packets from, for example, the Internet 20. As those skilled in the art should appreciate, a packet includes a plurality of bytes. At 204, the PDSN 18 detects whether the packet to be sent to the subscriber is the first packet to be retransmitted to the subscriber device. For example at 204, it may be determined that the subscriber device 12 cannot properly decode the PPP (point to point) frame. The subscriber device 12 may not be able to decode the frame because of, for example, signal distortion or other causes of excess errors induced for example by the channel. The determination may be done by, for example, monitoring for reception of a duplicate TCP acknowledgement from the subscriber device 12 or reception of a retransmitted TCP packet from the Internet 20. This determination will generally be referred to as detecting a retransmission.

If at 204 the PDSN 18 detects a first packet for retransmission, then at 206 the PDSN 18 activates a retransmitted bytes counter, then at 208 counts bytes to be retransmitted to the subscriber device and at 210 updates the retransmitted bytes counter. At 212 the PDSN 18 places the TCP packet into a PPP frame and at 222 a Check sum is calculated for the PPP frame. At 224 the PDSN 18 sends the PPP frame to the subscriber via the RAN. The resending of the uncompressed packet is done in order to resynchronize the subscriber device 12 with the PDSN 18 with respect to header compression. At 226, the UDR is adjusted in accordance with the retransmitted byte total and then the process ends.

At 204, when it is decided that a packet is not the first retransmitted packet, at 214 PDSN 18 counts the bytes to be transmitted to the subscriber device. At 216 PDSN 18 updates the retransmitted bytes counter. At 218 PDSN 18 removes the TCP header from the packet and at 220 it compress the TCP/IP header, preferably, according to a compression algorithm known as VJ header compression and places the packet in a PPP frame. At 222, a check sum is calculated for the PPP frame by the PDSN 18. At 224 the PDSN 18 sends the PPP frame to the subscriber via the RAN. At 226, the UDR is adjusted in accordance with the retransmitted byte total and then the process ends.

As a result, the counter will count the total number of uncompressed and compressed retransmitted bytes for providing a retransmitted byte total. The PDSN 18 is able to distinguish the retransmitted bytes from the originally transmitted bytes because the retransmitted bytes have headers containing sequence numbers of bytes transmitted from the source of the packet. If the sequence numbers do not increase or if the sequence numbers decrease, the PDSN 18 can recognize these bytes as retransmitted bytes. Of course the process repeats for additional activity. The usage recording agent 19 can do this by, for example, subtracting the retransmitted byte total from the record of the total number of the bytes (in the frame) transmitted to the subscriber device 12 or by simply forwarding the retransmitted byte total and the record of the total number of bytes to the broker 22. The broker 22 can then forward this information to the AAA 28 at the home network 24 so that the record can be adjusted in accordance with the retransmitted byte total. In any event, the end result is that a more accurate UDR is provided.

Figure 3:
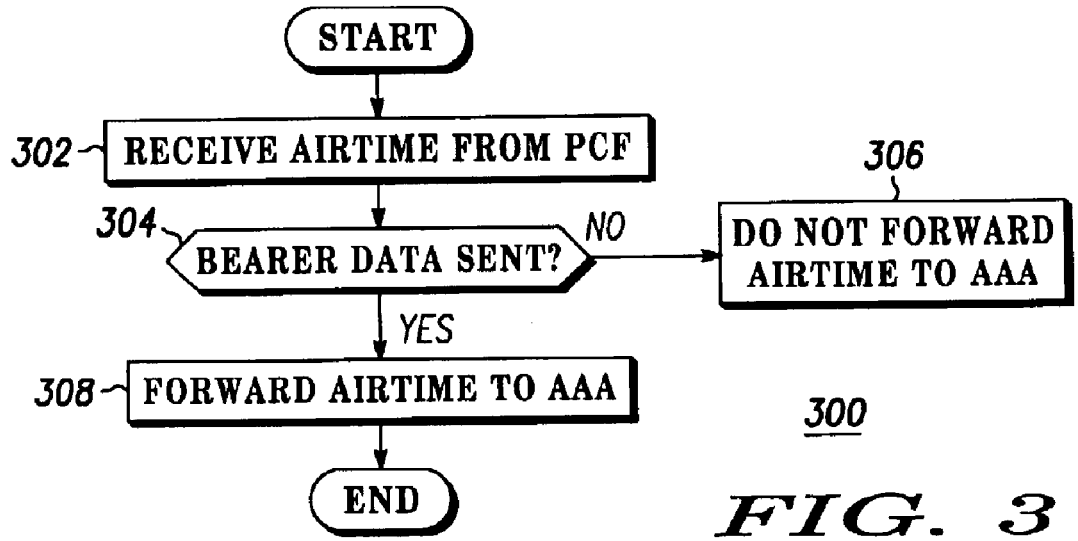
FIG. 3 illustrates a flow chart of a second embodiment for providing more accurate billing for a subscriber device.
Figure 4:
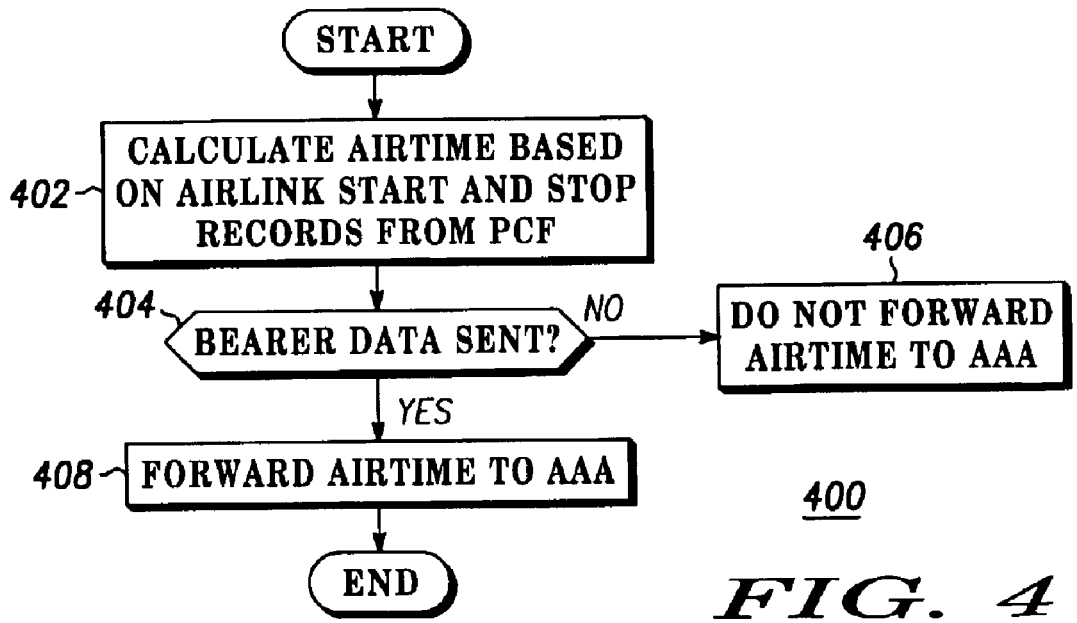
FIG. 4 illustrates a flow chart of the second embodiment when the PCF does not send airtime records.

Referring to FIG. 3, a flow diagram of a second embodiment will be discussed. Generally, the second embodiment provides a method 300 for more accurate billing for situations in which the PDSN 18 is relegated to the role of receiving from the PCF and including airtime minutes in the UDR. However, an operator of the PDSN 18 may not wish to charge the subscriber device user for airtime minutes that are used strictly to maintain mobility. Also, if a subscriber device user is being charged based on airtime for data sessions, there are many instances in which the RAN 14 may have to set up a dedicated radio frequency communication path for transmitting and receiving user information. This communication path, which will be referred to as a traffic channel for the subscriber device user, may be set up without any user data transfers. The non user data transferred over such a traffic channel will be referred to as signaling data. Examples of situations in which signaling data is transferred over a traffic channel include, for example, PPP initiations and handshakes, subscriber device IP registrations including but not limited to Mobile IP registrations, inter packet control function handoffs in which no data is sent or received and link control protocol echoes or responses sent or received.

The method 300 begins at 302 with the PDSN 18 receiving an airtime record from the PCF 16 of the RAN 14. As those skilled in the art should appreciate, the airtime record is a record of data activity during an airtime period in which a subscriber device 12 is on a traffic channel. At 304, the PDSN 18 determines if bearer data was sent during the airtime period of the airtime record. This may be accomplished by monitoring protocol identifications of data sent over the traffic channel to determine if only signaling data was sent or received during the airtime record. If, at 304 it is determined that only signaling data was sent during the airtime record, then at 306 the PSDN 18 does not forward the airtime record to the AAA 28.

If it is determined at 304 that bearer data was sent during the airtime record, then at 308 the PSDN 18 forwards the airtime record to the AAA 28. As a result, signaling data is prevented from distorting a total record of total data activity during all airtime periods.

The PCF 16 may not transmit an airtime record to the PSDN 18. The PCF 16 may, for example, transmit only airlink start and stop records. If this is the case, then the PSDN 18 will have to calculate the airtime record. This is shown at 402 in the method 400 of FIG. 4. With the exception of the calculation of the airtime record, the method 400, including 404, 406, and 408, is similar to the method 300 of FIG. 3.

Figure 5:
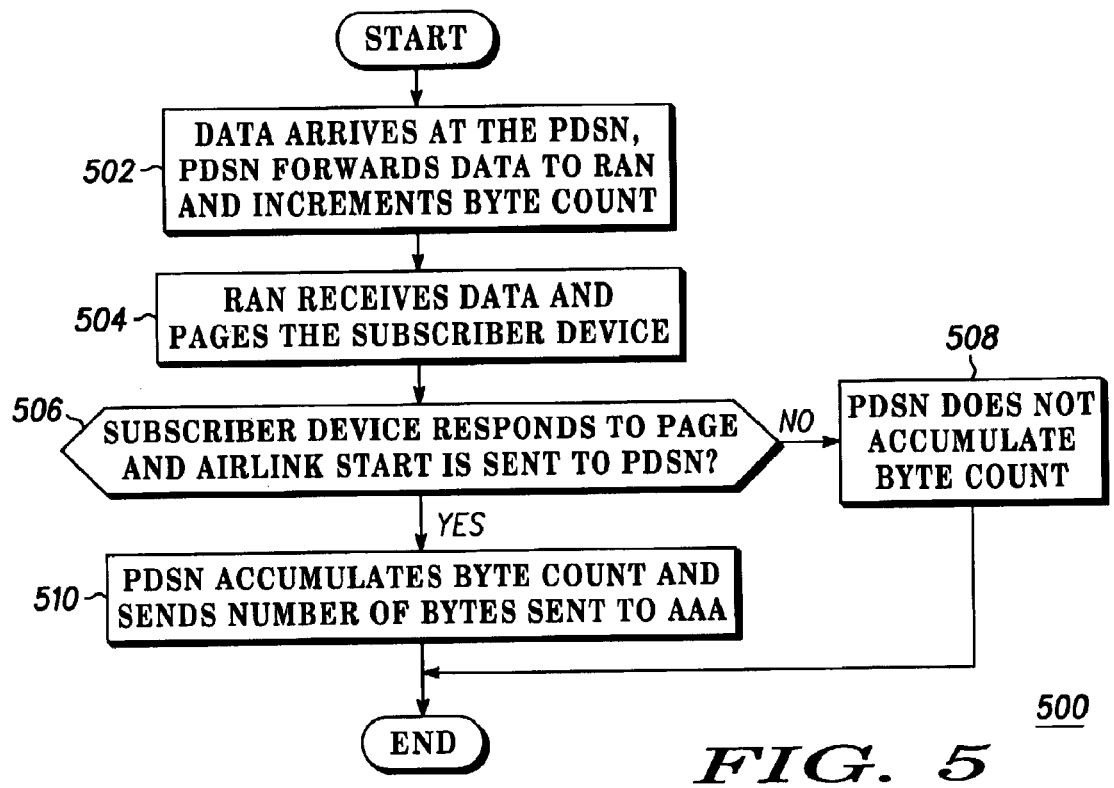
FIG. 5 illustrates a flow chart of a third embodiment for providing more accurate billing of a subscriber device.

Referring to FIG. 5, a flow diagram of a third embodiment will be discussed. Generally, the third embodiment provides a method 500 for more accurate billing for situations in which the subscriber device 12 is in a dormant state and fails to respond to a notification of data arrival from the RAN 14. The notification of data arrival may be, for example, a data transfer page or a short message sent to the subscriber device 12 by the RAN 14. The subscriber device 12 may be in the dormant state in the data transfer context when it has been assigned a traffic channel but is not using any air resources. For example, after a subscriber device 12 has downloaded a webpage, the subscriber device 12 may enter the dormant state while the user reads the webpage.

The method 500 begins at 502 with data arriving at the PDSN 18 and the PDSN 18 subsequently forwarding the data to the RAN 14. The PDSN 18 increments a byte count corresponding to the number of bytes in the data forwarded to the RAN 14. This is done by the usage recording agent 19. At 504, the RAN 14 receives the data and sends a notification of data arrival to the subscriber device 12. At 506, the PDSN 18 determines if the subscriber device 12 has responded to the notification of data arrival. This can be done by, for example, determining if the RAN 14 was successful in setting up a traffic channel with the subscriber device 12. The PCF 16 will send an active start indication such as an air link start message to the PDSN 18 only if the RAN 14 was successful in setting up the traffic channel and has acquired the subscriber device 12 on the traffic channel. If, at 506 it is determined that the subscriber device 12 has not responded to the notification of data arrival, then at 508 the usage recording agent 19 of the PSDN 18 does not accumulate the byte count into the user's UDR.

If it is determined at 506 that the subscriber device 12 has responded to the notification of data arrival, then at 510 the usage recording agent 19 of the PSDN 18 accumulates the byte count into the user's UDR.

Figure 6:
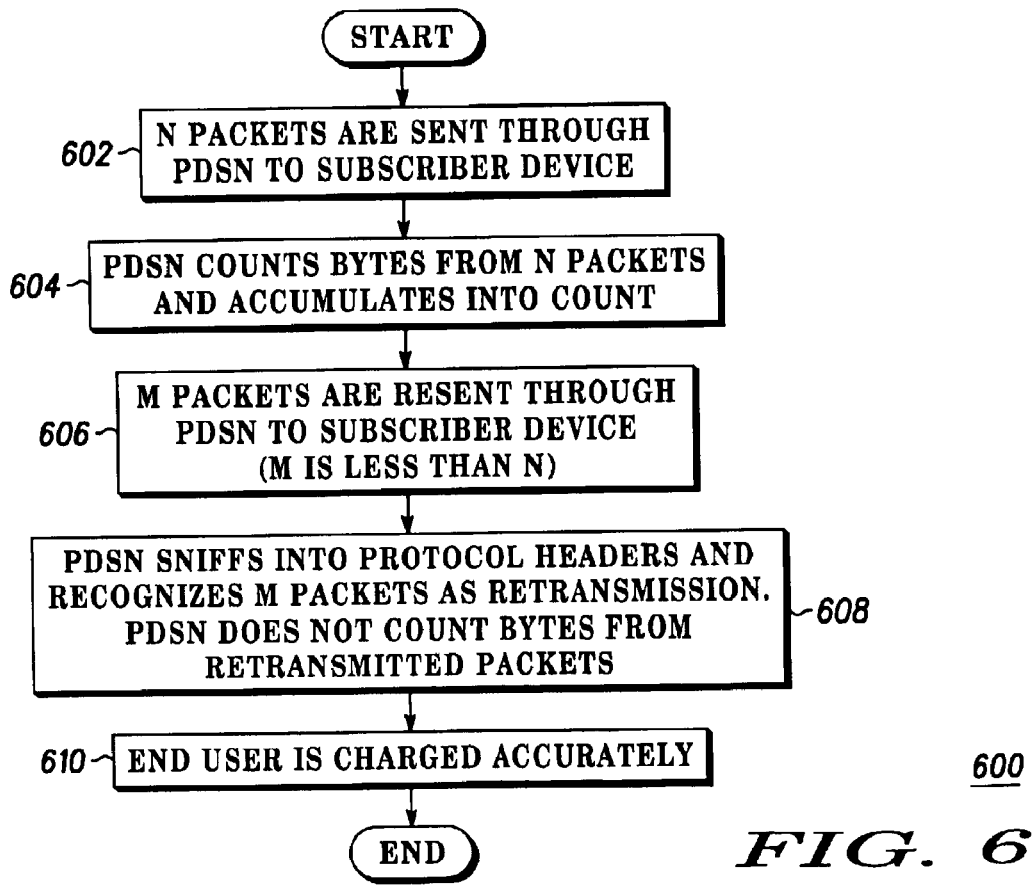
FIG. 6 illustrates a flow chart of a fourth embodiment for providing more accurate billing of a subscriber device.

Referring to FIG. 6, a flow diagram of a fourth embodiment of the present invention will be discussed. Generally, the fourth embodiment provides a method 600 for more accurate billing for situations in which the PDSN 18 has retransmitted packets to the subscriber device 12. Referring back to FIG. 2, the method 200 applied to situations in which the PDSN 18 retransmitted TCP/IP packets to the subscriber device 12 during VJ header compression. However, other protocols such as user datagram protocol are connectionless and include no retransmissions as part of the protocol. Therefore, retransmissions are done at higher layers such as the application layer. These retransmissions must also be counted in order to provide more accurate billing. In the method 200 the counting was done by counting the retransmitted TCP packets after resending an uncompressed frame. However, techniques of determining retransmissions in the higher layers can be different. Therefore, the PDSN 18 must have the capability to identify the higher layer protocols and to count the retransmitted bytes. This can be done recognizing the application layer header information and being able to detect retransmission from the application layer headers. This may be accomplished with the help of an external sniffer to sniff into the protocol headers to search for negative sequence growth in sequence numbers of the packets and by noting the byte length of the packets as retransmitted bytes. The external sniffer may be, for example, a Sniffer®Distributed or Sniffer®Portable made by Sniffer®Pro. The sniffer may also be a sniffer made by Ethereal®. The noted byte length can then be forwarded to the AAA 28 so that the UDR can be adjusted in accordance with the retransmitted byte total.

The method 600 begins at 602 with the PDSN 18 sending N packets to the subscriber device 12. At 604, the PDSN 18 counts the bytes from the N packets and accumulates them into a byte count. At 606, the PDSN 18 detects a portion (M) of the N packets that have been resent to the subscriber device due to a possible transmission or reception error. At 608, the PDSN 18 sniffs into the protocol headers of the retransmitted M packets and recognizes these M packets as retransmissions. The PDSN 18 will create a record of the retransmitted M bytes and forward this record to the AAA 28. The AAA 28 will adjust the byte count in accordance with the record of the retransmitted M bytes so that the retransmitted M bytes are not counted in the UDR. Alternatively, the PDSN 18 may subtract the M retransmitted bytes from the total N bytes rather than the adjusting being performed at the AAA 28.

The UDR may be implemented within a system that is conforming to the Third Generation Partnership Project 2 (3GPP2) specification. In such cases, the retransmitted M bytes may be forwarded to the AAA 28 as an additional 3GPP2 attribute (parameter) so that the billing can be adjusted in accordance with the retransmitted M bytes.

Therefore, the present invention provides a method and device for distinguishing overhead related activities from billable activities and thereby providing more accurate subscriber device billing. It is expected that one of ordinary skill given the above described principles, concepts and examples will be able to implement other alternative procedures within the scope of those discussed.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A method for more accurately recording subscriber device activity comprising:

creating a record that comprises a total number of bytes transmitted from a packet data serving node;

counting bytes that are retransmitted from the packet data serving node for providing a retransmitted byte total; and forwarding the retransmitted byte total to an accounting node so that the record can be adjusted in accordance with the retransmitted byte total.

2. The method of claim 1, further comprising detecting a retransmission of bytes, wherein the counting bytes that are retransmitted from a packet data serving node is performed after detecting a retransmission of bytes.

3. The method of claim 2, wherein the detecting a retransmission of bytes is done by monitoring for one of a duplicate transmission control protocol acknowledgement from a subscriber device and a retransmitted transmission control protocol packet from a connection to Internet.

4. The method of claim 1, wherein the counting bytes that are retransmitted from the packet data serving node further comprises counting bytes that are transmitted with compressed headers.

5. The method of claim 1, wherein:

the counting bytes that are retransmitted from the packet data serving node for providing a retransmitted byte total further comprises counting application layer bytes that are retransmitted; and the forwarding the retransmitted byte total to an accounting node so that the record can be adjusted in accordance with the retransmitted byte total further comprises forwarding the retransmitted byte total as a 3GPP2 attribute to the accounting node.

6. A method for more accurately recording subscriber device activity comprising:

creating a record that comprises a total number of bytes transmitted from a packet data serving node;

counting bytes that are retransmitted from the packet data serving node for providing a retransmitted byte total;

adjusting the record in accordance with the retransmitted byte total by subtracting the retransmitted byte total from the total number of bytes for providing an adjusted record.

7. A usage recording agent arranged to provide accurate billing of a subscriber device, the usage recording agent when installed and executing at a serving node resulting in the serving node:

determining if a retransmission of bytes by the serving node was performed during a time period;

counting bytes that are retransmitted from the serving node for providing a record to comprise a retransmitted byte total; and forwarding the record to an accounting node so that a transmitted byte total can be subtracted from the transmitted byte total.

8. The usage recording agent of claim 7, wherein:

the predetermined nonbillable activity comprises a retransmission of bytes by the serving node;

the creating a record corresponding to the nonbillable activity further comprises counting bytes that are retransmitted from a packet data serving node for providing a retransmitted byte total and subtracting the retransmitted byte total from the transmitted byte total for providing an adjusted record; and the forwarding the record to an accounting node so that a transmitted byte total can be adjusted in accordance with the record further comprises forwarding the adjusted record to the accounting node.

* * * * *